T. C. DUNCAN.
AGRICULTURAL IMPLEMENT FRAME.
APPLICATION FILED NOV. 28, 1919.
1,389,296.
Patented Aug. 30, 1921.
2 SHEETS—SHEET 1.
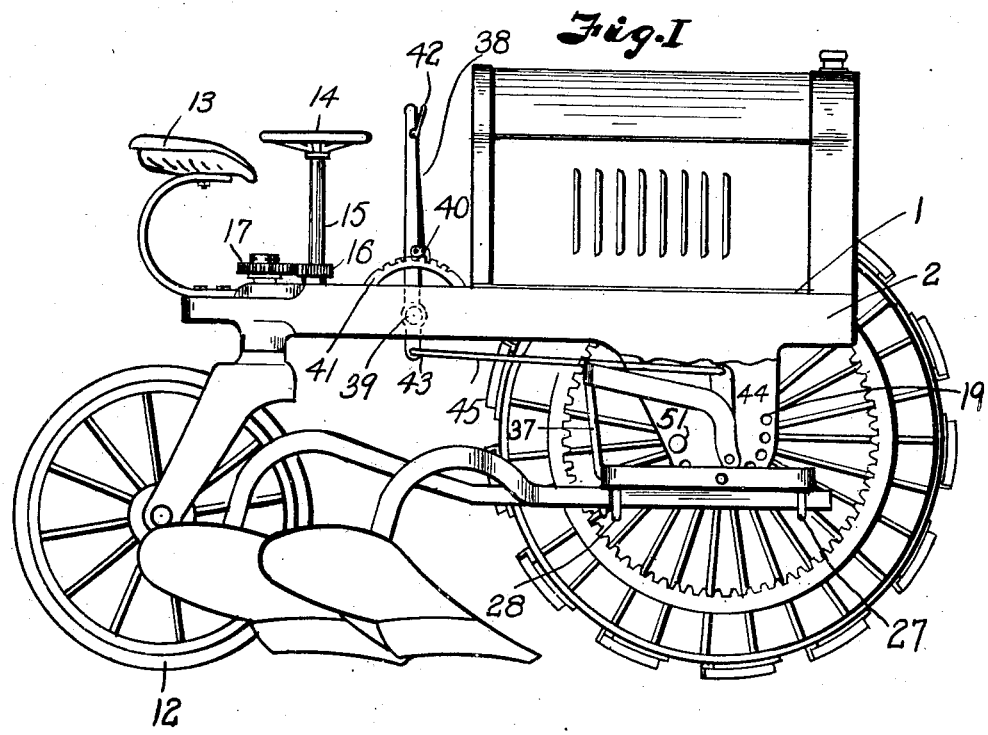
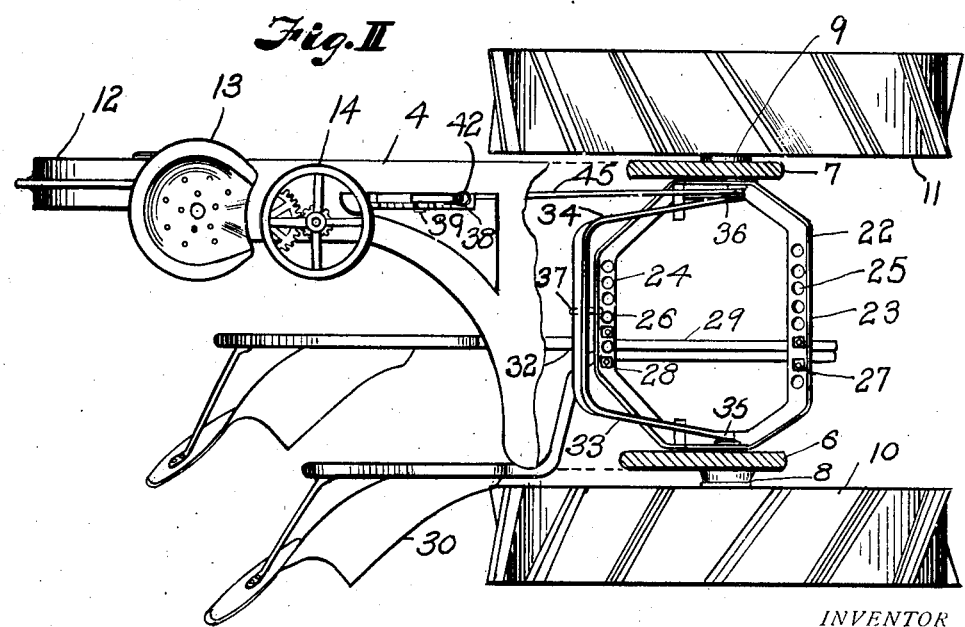
INVENTOR
Thomas C. Duncan
BY
ATTORNEY T. C. DUNCAN.
AGRICULTURAL IMPLEMENT FRAME.
APPLICATION FILED NOV. 28, 1919.
1,389,296.
Patented Aug. 30, 1921.
2 SHEETS—SHEET 2.
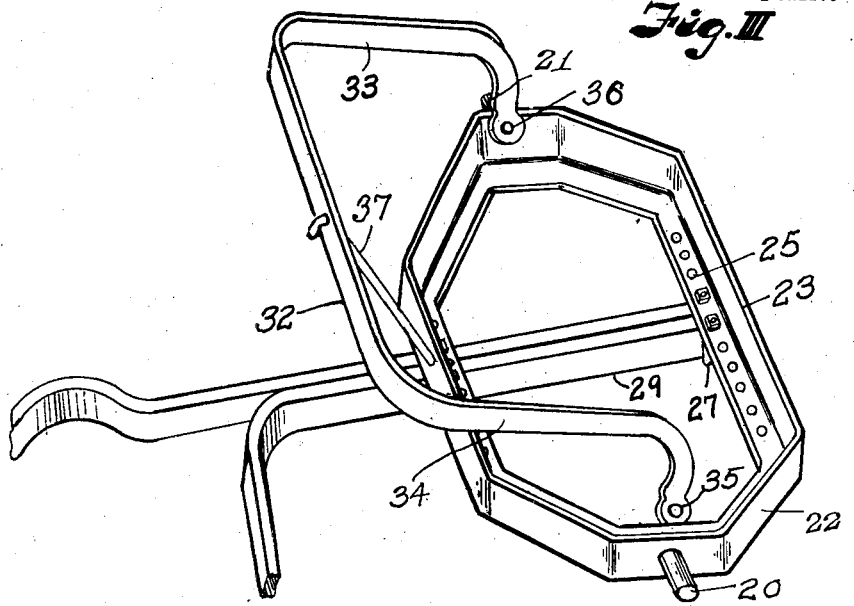
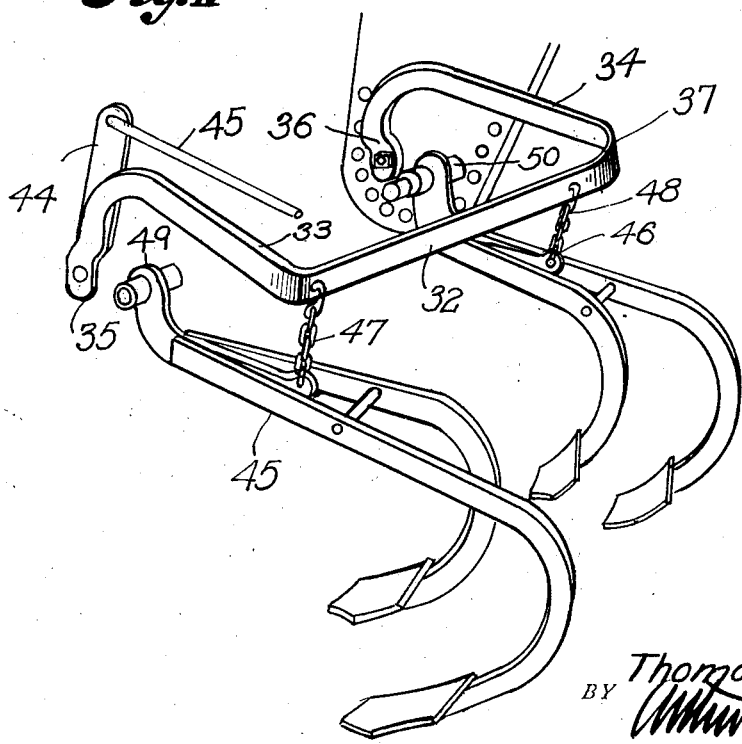
INVENTOR
Thomas C. Duncan
BY
ATTORNEY

UNITED STATES PATENT OFFICE.

THOMAS C. DUNCAN, OF KANSAS CITY, MISSOURI.

AGRICULTURAL-IMPLEMENT FRAME.

1,389,296. Specification of Letters Patent. Patented Aug. 30, 1921.

Application filed November 28, 1919. Serial No. 341,251.

*To all whom it may concern:*

Be it known that I, THOMAS C. DUNCAN, a citizen of the United States, residing at Kansas City, in the county of Jackson and State of Missouri, have invented certain new and useful Improvements in Agricultural-Implement Frames; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to agricultural implements and particularly to means for interchangeably connecting different types of ground working tools to their vehicle.

The vehicle is illustrated in the drawings as of the tractor type and I will describe my invention in connection therewith.

My invention contemplates the provision of means whereby ground working tools may be adjusted both as to lateral position and as to depth of entrance into the ground. For example, cultivating tools will not be required to enter the ground as deeply as plow points, so I have made provision for accommodating the different tools to the different requirements and it is this provision which constitutes one of the novel features of my invention.

Other objects and advantages of the invention will be specifically referred to hereinafter, it being understood that changes in form, proportion and minor details of construction may be resorted to without departing from the spirit of the invention or sacrificing any of its advantages.

In the drawings,

Figure I is a side elevational view of my invention, showing plows arranged in gang.

Fig. II is a top plan view of the same with the engine removed.

Fig. III is a detail perspective view of the ground working tool-carrying frame and its actuator, and Fig. IV is a detail perspective view of the actuator and cultivater teeth connected thereto.

Referring now to the drawings by numerals of reference:

1 designates a vehicle shown as a tractor having a body frame, the forward part of which is substantially rectangular, as at 2, and the rear portion 3 of which is a continuation of one of the side bars to provide a caster wheel supporting bar 4, braced to the frame part 2 by a fillet 5, as clearly indicated in Fig. II.

Depending from the forward part 2 of the frame are brackets or wheel bearings 6 and 7, in which the ground wheel axles 8 and 9 are secured and these axles carry the ground tractor wheels 10 and 11, the rear portion of the frame being supported upon the caster wheel 12, swiveled to the rear end of the bar 4. The bar supports a seat 13 for the operator and it is in convenient position with respect to a steering wheel 14, the shaft 15 of which carries a pinion 16, meshing with a gear 17 on the pintle 18 of the caster wheel 12, so that the machine may be steered.

The brackets 6 and 7 are provided with arcuate rows of perforations 19 to adjustably receive the trunnions 20 and 21 of the ground working tool supporting frame 22, which is provided with the forward and rearward cross bars 23 and 24, respectively provided with rows of perforations 25 and 26 whereby fastening devices 27 and 28, such as U bolts and J bolts may be introduced to secure the beams 29 of the plows 30, it being possible to secure any one or any multiple of one within determined limits and these plow beams may be adjusted laterally of the frame by removing the fastening devices 27 and 28 and shifting them in an obvious manner.

Above the frame 22 is a yoke-shaped actuating member 31 having a transverse bar 32 extending partially across the frame 22 and provided with forwardly projecting arms 33 and 34, which terminate in downwardly projecting extensions 35 and 36, pivoted to the brackets 6 and 7, and the bar 32 of said yoke is connected to the frame 22 by a link 37 so that when the yoke is swung on its pivot, a swinging action can be imparted to the ground tool supporting frame 22 so as to raise or lower the ground working tools or plows 30, and said yoke may be actuated from a point convenient to the seat 13 through the medium of a manually operated lever 38, pivoted at 39 to the bar 4 and provided with a pawl 40 adapted to engage a segmental rack 41 so the lever may be held in any determined position, the pawl being releasable through the lever 42 in the usual manner. The depending end 43 of said lever 38 is connected to an upstanding arm 44, carried by the yoke, through the medium of a link 45 so that the operator may control the depth that the ground working tools enter the ground or can raise them out of the ground by operating the lever 38, as will be clearly apparent by reference to Fig. I.

Various types of ground working tools may be substituted for the plows shown in Figs. I and II and the frame 22 may be adjusted at any height by placing the trunnions 20 and 21 in the proper perforations in the brackets 6 and 7. Therefore, the frame is capable of forward or rearward adjustment as well as vertical adjustment and the ground working tool beams may be adjusted forwardly or laterally by loosening the fastening devices 27 and 28 and the beams may be adjusted longitudinally in the U bolts or J bolts so that it will be seen that any necessary adjustment may be made.

If cultivator teeth are to be employed, the arrangement may partake of that shown in Fig. IV, in which the yoke 37 is connected to the cultivator beams 45 and 46 by the flexible connections or chains 47 and 48, the cultivator beams being provided with trunnions 49 and 50 to engage the openings 51 in the brackets 6 and 7, there being a corresponding opening in each bracket.

The yoke will be separated in substantially the same manner as when the plows are employed so that the operator may lift the cultivators clear of the ground or determine the depth at which they will enter the ground.

From the foregoing it will be apparent that the vehicle is provided with mechanism whereby ground working tools may be utilized for performing different kinds of work upon the farm, and that the necessary adjustments required to be made in applying the ground working tools may be accomplished in a simple and expeditious manner.

It will also be apparent that ground working tools other than those illustrated may be employed in connection with the device without departing from the spirit of the invention.

What I claim and desire to secure by Letters-Patent is:

1. In an agricultural machine, a wheeled frame, depending brackets carried by said frame and supporting the wheels thereof, said brackets having an arcuate series of openings, a substantially rectangular tilting frame, having trunnions at its ends to adjustably engage said openings, and means for adjustably securing ground working tools to said rectangular frame.

2. In an agricultural machine, a wheeled frame, depending brackets carried by said frame and supporting the wheels thereof, said brackets having an arcuate series of openings, a substantially rectangular tilting frame having trunnions at its ends to adjustably engage said openings, means for adjustably securing ground working tools to said rectangular frame, and a yoke-shaped actuator connected to the depending brackets and operably connected to said tilting frame.

3. In an agricultural machine, a wheeled frame, depending brackets carried by said frame provided with arcuate series of openings, a rectangular tilting frame having trunnions at its ends to adjustably engage said openings, laterally adjustable means for securing the ground working tools to said rectangular frame, and manual means for tilting said frame.

4. In an agricultural machine, a wheeled frame, depending brackets carried by said frame provided with arcuate series of openings, a rectangular tilting frame having trunnions at its ends to adjustably engage said openings, laterally adjustable means for securing the ground working tools to said rectangular frame, and manual means for tilting said frame comprising a yoke pivoted to the brackets and having a rearwardly projecting portion connected to said frame.

5. In an agricultural machine, a wheeled frame, depending brackets carried by said frame and supporting the wheels thereof, a substantially rectangular tilting frame having trunnions at its ends to adjustably engage series of openings in said brackets, and a yoke-shaped actuator connected to the depending brackets and operably connected to the tilting frame.

6. In an agricultural machine, a wheeled frame, an arcuate series of openings on each side of the frame, a tilting frame having trunnions for adjustable engagement with said openings, means for securing the ground working tools to the frame, and means for tilting said frame.

In testimony whereof I affix my signature.

THOMAS C. DUNCAN.